(12) United States Patent
Shipulski et al.

(10) Patent No.: US 9,522,438 B2
(45) Date of Patent: Dec. 20, 2016

(54) BATTERY-CONTROLLED PLASMA ARC TORCH SYSTEM

(71) Applicant: Hypertherm, Inc., Hanover, NH (US)

(72) Inventors: E. Michael Shipulski, Etna, NH (US); Michael Hoffa, Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 618 days.

(21) Appl. No.: 13/672,956

(22) Filed: Nov. 9, 2012

(65) Prior Publication Data

US 2014/0131324 A1    May 15, 2014

(51) Int. Cl.
*B23K 10/00* (2006.01)
*H05H 1/36* (2006.01)

(52) U.S. Cl.
CPC ............. *B23K 10/006* (2013.01); *B23K 10/00* (2013.01); *H05H 1/36* (2013.01)

(58) Field of Classification Search
CPC combination set(s) only.
See application file for complete search history.

(56) References Cited

U.S. PATENT DOCUMENTS

| | | |
|---|---|---|
| 3,309,497 A | 3/1967 | Kensrue |
| 4,182,949 A | 1/1980 | Powers et al. |
| 4,370,539 A | 1/1983 | Garlanov |
| 4,525,621 A | 6/1985 | Puschner |
| 4,791,268 A | 12/1988 | Sanders et al. |
| 5,070,227 A | 12/1991 | Luo et al. |
| 5,086,205 A | 2/1992 | Thommes |
| 5,225,657 A | 7/1993 | Blankenship |
| 5,225,658 A | 7/1993 | Yamaguchi et al. |
| 5,250,786 A | 10/1993 | Kikuchi et al. |
| 5,416,297 A | 5/1995 | Luo et al. |
| 5,472,024 A | 12/1995 | Brugerolle et al. |
| 5,660,745 A | 8/1997 | Naor |
| 5,828,030 A | 10/1998 | Naor |
| 5,886,315 A | 3/1999 | Lu et al. |
| 5,900,169 A | 5/1999 | Borowy et al. |
| 5,961,855 A | 10/1999 | Hewett et al. |

(Continued)

FOREIGN PATENT DOCUMENTS

| | | |
|---|---|---|
| CA | 1090428 | 11/1980 |
| CN | 86210798 U | 10/1987 |

(Continued)

OTHER PUBLICATIONS

Hobart Welders "Trek™ 180 Battery-Powered MIG Welding Package," HobartWelders.com, Sep. 2009.

*Primary Examiner* — Quang D Thanh
*Assistant Examiner* — Renee Larose
(74) *Attorney, Agent, or Firm* — Proskauer Rose LLP

(57) ABSTRACT

A method is provided for operating a plasma arc torch system having a power supply and a plasma arc torch. The method includes supplying power to the power supply from a battery. The battery provides at least a portion of the power to generate a plasma arc by the plasma arc torch. The method also includes communicating a first signal, indicating at least one parameter of the battery, between the battery and a control unit of the power supply, generating a second signal, by the control unit, based on the at least one parameter of the battery, and controlling, using the control circuit, operation of the plasma arc torch based on the second signal.

25 Claims, 4 Drawing Sheets

(56) References Cited

U.S. PATENT DOCUMENTS

| | | |
|---|---|---|
| 6,051,809 A | 4/2000 | Colella |
| 6,054,670 A | 4/2000 | Naor |
| 6,111,215 A | 8/2000 | Lilly |
| 6,194,682 B1 | 2/2001 | Schneider et al. |
| 6,225,596 B1 | 5/2001 | Chandler et al. |
| 6,242,710 B1 | 6/2001 | Naor |
| 6,331,694 B1 | 12/2001 | Blankenship |
| 6,350,960 B1 | 2/2002 | Norris |
| 6,365,868 B1 | 4/2002 | Borowy et al. |
| 6,406,759 B1 | 6/2002 | Roth |
| 6,444,944 B2 | 9/2002 | Schneider et al. |
| 6,476,354 B1 | 11/2002 | Jank et al. |
| 6,479,795 B1 | 11/2002 | Albrecht et al. |
| 6,486,430 B2 | 11/2002 | Naor |
| 6,512,201 B2 | 1/2003 | Blankenship |
| 6,552,303 B1 | 4/2003 | Blankenship et al. |
| 6,703,581 B2 | 3/2004 | Jones et al. |
| 6,747,246 B2 | 6/2004 | Crandell, III |
| 6,777,649 B2 | 8/2004 | Reynolds et al. |
| 6,815,632 B2 | 11/2004 | Dallavalle |
| 6,818,860 B1 | 11/2004 | Stava et al. |
| 6,881,921 B2 | 4/2005 | Horner-Richardson et al. |
| 6,903,301 B2 | 6/2005 | Jones et al. |
| 6,977,358 B2 | 12/2005 | Albrecht et al. |
| 6,982,398 B2 | 1/2006 | Albrecht |
| 7,183,517 B2 * | 2/2007 | Albrecht et al. ........... 219/130.4 |
| 7,188,645 B2 | 3/2007 | Bender et al. |
| 7,355,141 B2 | 4/2008 | Albrecht et al. |
| 7,423,238 B2 | 9/2008 | Stanzel et al. |
| 7,615,719 B2 | 11/2009 | Shipulski |
| 7,615,720 B2 | 11/2009 | Sanders |
| 8,203,096 B2 | 6/2012 | Sanders et al. |
| 8,344,675 B2 * | 1/2013 | Miwa .................... H02P 29/032 318/471 |
| 8,350,182 B2 | 1/2013 | Shipulski |
| 8,373,084 B2 | 2/2013 | Salsich |
| 8,405,001 B2 | 3/2013 | Albrecht |
| 8,569,652 B2 | 10/2013 | Albrecht et al. |
| 8,791,388 B2 | 7/2014 | Albrecht |
| 8,890,021 B2 | 11/2014 | Shipulski |
| 2001/0037996 A1 | 11/2001 | Naor |
| 2001/0042736 A1 | 11/2001 | Schneider et al. |
| 2002/0023908 A1 | 2/2002 | Blankenship |
| 2002/0117483 A1 | 8/2002 | Jones et al. |
| 2002/0117484 A1 | 8/2002 | Jones et al. |
| 2002/0187066 A1 | 12/2002 | Yu et al. |
| 2004/0069752 A1 | 4/2004 | Ulrich et al. |
| 2004/0149702 A1 | 8/2004 | Dallavalle |
| 2004/0232118 A1 | 11/2004 | Horner-Richardson et al. |
| 2005/0000946 A1 | 1/2005 | Albrecht et al. |
| 2005/0073282 A1 | 4/2005 | Carrier et al. |
| 2005/0077878 A1 | 4/2005 | Carrier et al. |
| 2005/0109748 A1 | 5/2005 | Albrecht et al. |
| 2005/0111995 A1 | 5/2005 | Everson |
| 2005/0252889 A1 | 11/2005 | Stanzel et al. |
| 2005/0252890 A1 | 11/2005 | Stanzel et al. |
| 2005/0252899 A1 | 11/2005 | Stanzel et al. |
| 2005/0263514 A1 | 12/2005 | Albrecht |
| 2006/0124638 A1 | 6/2006 | Jensen |
| 2006/0138113 A1 | 6/2006 | Ott |
| 2007/0181547 A1 * | 8/2007 | Vogel et al. ................ 219/130.1 |
| 2007/0187376 A1 | 8/2007 | Albrecht et al. |
| 2007/0193762 A1 * | 8/2007 | Arimura .................... H02H 5/04 173/217 |
| 2007/0221628 A1 | 9/2007 | Stanzel et al. |
| 2007/0257084 A1 | 11/2007 | Carrier et al. |
| 2008/0029153 A1 | 2/2008 | Margalit |
| 2008/0210676 A1 * | 9/2008 | Lambirth et al. .......... 219/130.1 |
| 2009/0008374 A1 * | 1/2009 | Fosbinder ................ B23K 9/10 219/130.21 |
| 2009/0057285 A1 | 3/2009 | Bashore et al. |
| 2010/0051595 A1 * | 3/2010 | Diedrick et al. .......... 219/137 R |
| 2010/0117581 A1 * | 5/2010 | Miwa .................... H02P 29/032 318/472 |
| 2010/0314375 A1 * | 12/2010 | Kaufman ................. 219/137.71 |
| 2012/0006792 A1 * | 1/2012 | Rozmarynowski .... B23K 9/327 219/74 |
| 2016/0184917 A1 | 6/2016 | Albrecht |

FOREIGN PATENT DOCUMENTS

| | | |
|---|---|---|
| CN | 2682717 Y | 3/2005 |
| DK | 8308999.3 | 11/1983 |
| EP | 1500456 A1 | 1/2005 |
| EP | 1535691 A2 | 6/2005 |
| EP | 1596123 A1 | 11/2005 |
| EP | 1679666 A2 | 12/2005 |
| EP | 1629926 A2 | 3/2006 |
| EP | 1852206 A2 | 11/2007 |
| GB | 1453100 | 10/1976 |
| GB | 2316244 A | 2/1998 |
| JP | 56077068 A | 6/1981 |
| JP | 01245972 A | 10/1989 |
| WO | 2000/76709 A1 | 12/2000 |
| WO | 2005/026650 A2 | 3/2005 |
| WO | 2009/085370 A1 | 7/2009 |

* cited by examiner ically to a battery-powered plasma arc torch system, and more particularly, to optimization of battery performance and cutting performance by the plasma arc torch system.

BATTERY-CONTROLLED PLASMA ARC TORCH SYSTEM

FIELD OF THE INVENTION

The present invention relates generally to a battery-powered plasma arc torch system, and more particularly, to optimization of battery performance and cutting performance by the plasma arc torch system.

BACKGROUND OF THE INVENTION

Thermal processing torches, such as plasma arc torches, are widely used in the heating, cutting, gouging and marking of materials. A plasma arc torch generally includes an electrode, a nozzle having a central exit orifice mounted within a torch body, electrical connections, passages for cooling, and passages for arc control fluids (e.g., plasma gas). Optionally, a swirl ring is employed to control fluid flow patterns in the plasma chamber formed between the electrode and the nozzle. In some torches, a retaining cap can be used to maintain the nozzle and/or swirl ring in the plasma arc torch. In operation, the torch produces a plasma arc, which is a constricted jet of an ionized gas with high temperature and sufficient momentum to assist with removal of molten metal.

The operation of a plasma arc torch can be powered, at least partially, by a battery pack including one or more battery cells. However, such a design poses a challenging technical problem due the nature of batteries. For example, battery performance is often reduced in cold-temperature environment. Hence, an increased number of battery cells are often required to maintain a minimum input voltage supplied to the plasma arc torch, thereby increasing the overall size, weight and cost of the battery pack. In today's market, no light-weight, reasonably-sized and low-cost battery packs exist that can power a plasma arc torch to enable relatively long cutting time at a wide range of environmental temperatures. In addition, a plasma arc torch system needs to maintain many other battery attributes within acceptable operating ranges so as to optimize battery performance while minimizing battery cost, size and weight. These battery attributes include, for example, battery voltage, current, number of charge and/or discharge cycles.

SUMMARY OF THE INVENTION

Thus, systems and methods are needed to optimize battery performance of a plasma arc torch system while reducing cost, size and weight. Specifically, battery performance needs to be optimized with respect to one or more battery attributes, including temperature. In addition, systems and methods are needed to optimize operation of a plasma arc torch based on battery attributes.

In one aspect, a method is provided for operating a plasma arc torch system having a power supply and a plasma arc torch. The method includes supplying power to the power supply from a battery. The battery provides at least a portion of the power to generate a plasma arc by the plasma arc torch. The method also includes communicating a first signal, indicating at least one parameter of the battery, between the battery and a control unit of the power supply, generating a second signal, by the control unit, based on the at least one parameter of the battery, and controlling, using the control circuit, operation of the plasma arc torch based on the second signal.

In some embodiments, controlling operation of the plasma arc torch includes preventing the plasma arc torch from being shut down in accordance with the second signal.

In some embodiments, controlling operation of the plasma arc torch includes adjusting an output power supplied by the power supply to the plasma arc torch based on the at least one parameter of the battery. For example, the output power can be lowered when a temperature of the battery is below a threshold. As another example, the output power can be modified to maintain the plasma arc when the at least one parameter of the battery exceeds a threshold.

In some embodiments, controlling operation of the plasma arc torch includes adjusting power delivered to the plasma arc torch based on the at least one parameter of the battery. For example, the power delivered to the plasma arc torch can be lowered when a temperature of the battery is below a threshold.

In some embodiments, controlling operation of the plasma arc torch includes using a cutting program, a current ramping profile or a gas ramping profile, or a combination thereof, to operate the plasma arc torch.

In some embodiments, the method further includes transmitting the first signal via a power connection while the power connection provides power from the battery to the power supply.

In some embodiments, the method further includes adjusting the at least one parameter of the battery based on the operation of the plasma arc torch.

In some embodiments, the method further includes locating a plasma control circuit and a battery control circuit in a single enclosure. The battery control circuit determines the at least one parameter of the battery and forwards the parameter to the plasma control circuit. The plasma control circuit controls the operation of the plasma arc torch based on the at least one parameter.

In some embodiments, the method further includes locating a plasma control circuit and a battery control circuit on a single circuit board inside of the control unit. The battery control circuit determines the at least one parameter of the battery and forwards the parameter to the plasma control circuit. The plasma control circuit controls the operating process of the plasma arc torch based on the at least one parameter.

In another aspect, a plasma arc torch system is provided. The plasma arc torch system includes a power supply for supplying an operating power to operate a plasma arc torch. The system includes a battery for providing at least a portion of the operating power to generate a plasma arc. The system further includes a control unit for controlling at least one operating parameter of the plasma arc torch based on battery data. The control unit includes: 1) a plasma control circuit coupled to the power supply for controlling the at least one operating parameter of the plasma arc torch, and 2) a battery control circuit coupled to the battery and in communication with the plasma control circuit. The battery control circuit is configured to determine the battery data and provide the battery data to the plasma control circuit.

In some embodiments, the plasma arc torch system further includes a circuit board including both the plasma control circuit and the battery control circuit. In some embodiments, the plasma arc torch system further includes a single enclosure housing both the plasma control circuit and the battery control circuit.

In some embodiments, the control unit is integrated with the power supply. The plasma arc torch system can further include a power connection between the power supply and the battery. The power connection can be configured to perform at least one of 1) providing an electrical connection between the battery and the power supply, 2) transmitting the battery data between the battery and the control unit of the power supply, or 3) transmitting at least one instruction for operating the plasma arc torch between battery and the control unit of the power supply.

In some embodiments, the plasma arc torch system further includes a heating or cooling unit in thermal communication with the battery. The control unit is adapted to adjust a temperature of the heating or cooling unit to modulate a temperature of the battery based on the at least one operating parameter of the plasma arc torch. The heating or cooling unit can be integrated with the battery.

In other examples, any of the aspects above can include one or more of the following features. In some embodiments, the at least one parameter of the battery includes one of a battery current, temperature, state of charge, coulomb count, voltage, age, number of cycles, date, internal impedance, state of health, time to empty, time to full, discharge status, charge status, or capacity, or a combination thereof.

In some embodiments, the first signal includes information displayable by the plasma arc torch system to an operator of the plasma arc torch. The information may not be used by the control unit to control the operation of the plasma arc torch.

In another aspect, a method is provided for operating a plasma arc torch system having a power supply and a plasma arc torch. The method includes supplying power to the power supply from a battery. The battery provides at least a portion of the power to generate a plasma arc by the plasma arc torch. The method includes communicating a first signal, indicating at least one parameter of the battery, between the battery and a control unit of the power supply. The method further includes generating a second signal, by the control unit, based on the at least one parameter of the battery and maintaining, by the control circuit, the plasma arc generated by the plasma arc torch by adjusting at least one of the at least one parameter of the battery or an operating parameter of the plasma arc torch. The method can also include maintaining the plasma arc when a temperature of the battery exceeds a threshold. The at least one parameter of the battery can include one of battery temperature, state of charge, voltage, current, or power. The operating parameter of the plasma arc torch can include one of power, current, a cutting program, a current ramping profile or a gas ramping profile.

It should also be understood that various aspects and embodiments of the invention can be combined in various ways. Based on the teachings of this specification, a person of ordinary skill in the art can readily determine how to combine these various embodiments. For example, in some embodiments, any of the aspects above can include one or more of the above features. One embodiment of the invention can provide all of the above features and advantages.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

In a battery-powered plasma arc torch system, where at least one battery cell provides some, most, or all of the input power to the plasma system, it is important to optimize battery performance and attributes (e.g., battery temperature, voltage, and/or current) and plasma cutting performance (e.g., cut duration, performance at extreme temperatures, cut speed, cut thickness, cut quality, and/or consumable life). Technologies of the present invention can maintain attributes of one or more battery cells of a plasma arc torch system within their preferred operating ranges and use the battery data to control operation of a plasma arc torch. A control scheme implementing the principles of the present invention is adapted to optimize both plasma cutting and battery performance.

Figure 1:
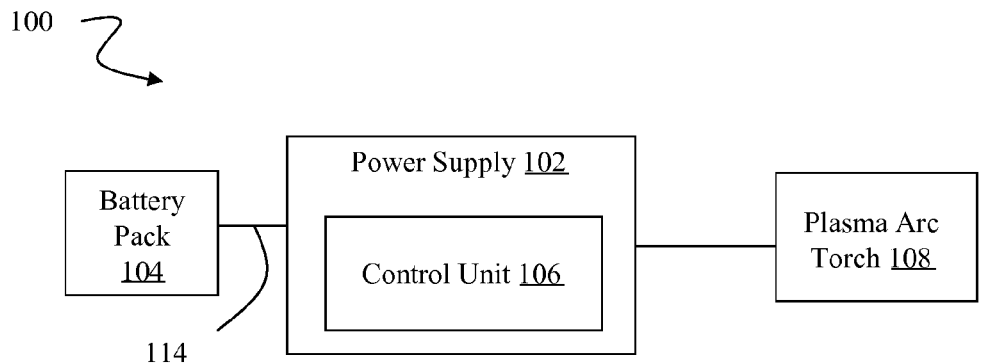
FIG. 1 illustrates an exemplary plasma arc torch system according to some embodiments of the present invention.

FIG. 1 illustrates an exemplary plasma arc torch system according to some embodiments of the present invention. The plasma arc torch system 100 includes a power supply 102, a battery pack 104, a control unit 106 and a plasma arch torch 108. The battery pack 104, in connection with the power supply 102, provides at least a portion of the operating power to generate a plasma arc by the plasma arc torch 108. In some embodiments, the power supply 102 is adapted to convert an input power, expressed as a combination of input voltage and input current, to a power level required to operate the plasma arc torch 108, including a required voltage level and/or a required current level. In some embodiments, the power used to operate the plasma arc torch 108 is supplied entirely by the battery pack 104. In some embodiments, the plasma arc torch 108 is powered by the battery pack 104 as well as another power source (not shown), such as a power source connected to the wall. The battery pack 104 can include one or more battery cells, each of which can be replaceable or rechargeable. The control unit 106 is configured to control at least one operating parameter of the plasma arc torch based on information collected about the battery pack 104. The control unit 106 can also control performance of the battery pack 104. FIG. 1 illustrates the control unit 106 being located inside of the power supply 102, such as being integrated with the power supply 102. However, in other embodiments, the control unit 106 is located external to the power supply 102, but maintains electrical communication with the power supply 102. In addition, the system 100 can include various user controls (not shown), such as a current limiting switch, a toggle switch, a key pad, a touch pad, dials, knobs or other means to enable a user to manipulate or otherwise control parameters of the torch 108.

The plasma arc torch 108 has a variety of applications, such as cutting thick plates of steel and cutting comparatively thin sheets of galvanized metal commonly used in heating, ventilation, and air conditioning (HVAC) systems. The basic components of the plasma arc torch 108 can include a torch body, an electrode (cathode) mounted within the body, a nozzle (anode) with a central exit orifice, a gas source to provide a flow of an ionizable gas, electrical connections, passages for cooling and arc control fluids, and a power source that produces a pilot arc in the gas, typically between the electrode and the nozzle, and then a plasma arc, a conductive flow of the ionized gas from the electrode to a workpiece. The gas can be non-oxidizing, e.g. nitrogen, argon/hydrogen, or argon, or oxidizing, e.g. oxygen or air.

In some embodiments, there is a power connection 114 between the power supply 102 and the battery pack 104. The power connection 114 is configured to provide an electrical connection between the battery pack 104 and the power supply 102. The power connection 114 can also transmit, between the battery pack 104 and the power supply 102, at least one of the following information: data about the battery pack 104, instructions for operating the plasma arc, or instructions for adjusting attributes associated with the battery pack 104.

Figure 2:
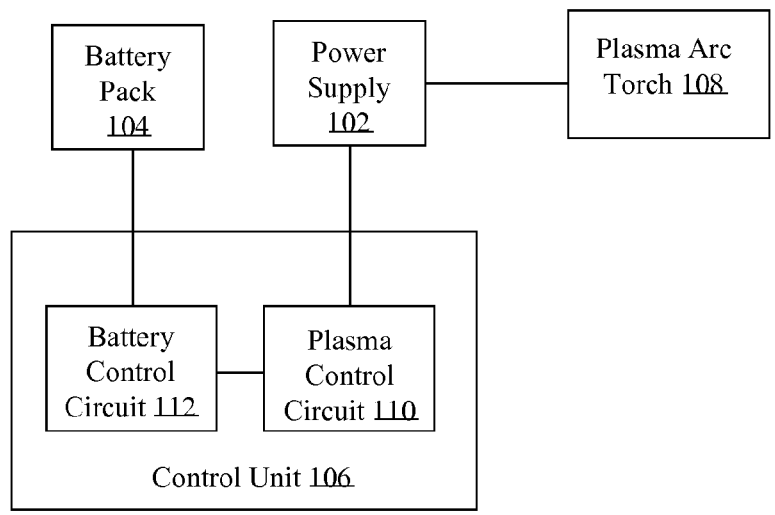
FIG. 2 illustrates an exemplary control unit of the plasma arch torch system of FIG. 1.

FIG. 2 illustrates exemplary an exemplary control unit of the plasma arc torch system 100 FIG. 1. The control unit 106 includes a plasma control circuit 110 in communication with a battery control circuit 112. The plasma control unit 110 is coupled to the power supply 102 and controls at least one operating parameter of the plasma arc torch 108 based on battery data obtained from the battery control circuit 112. The battery control circuit 112 is coupled to the battery pack 104. The battery control circuit 110 determines information about the battery pack 104 and provides at least a portion of the battery data to the plasma control circuit 110. The battery control circuit 110 also controls performance of the battery pack 104 based on the battery data and information about the plasma arc torch 108 obtained from the plasma control circuit 110. The plasma control circuit 110 and the battery control circuit 112 can be located in a single enclosure or different enclosures, where each enclosure can include one or more circuit boards implementing the plasma control circuit 110 and the battery control circuit 112. The plasma control circuit 110 and the battery control circuit 112 can be located on a single circuit board or different circuit boards. One or more of the enclosure(s) or circuit board(s) can be located inside or outside of the power supply 102.

Battery data transmitted between the battery pack 104 and the control unit 106 includes, for example, battery current, temperature, state of charge, coulomb count, voltage, age, number of cycles, date, internal impedance, state of health, time to empty capacity, time to full capacity, discharge status, charge status, or capacity, or a combination thereof. The control unit 106, based on the battery data, can automatically regulate the operation of the plasma arc torch 108 by controlling various inputs supplied to the plasma arc torch 108, such as the voltage, current, gas pressure, cutting mode. In some embodiments, the control unit 106 adjusts an output power supplied by the power supply 102 to the plasma arc torch 108 based on the battery data. For example, the control unit 106 can cause the power supply 102 to modify its output power in order to maintain a plasma arc generated by the plasma arc torch 108, even when a parameter of the battery exceeds a threshold (i.e., above a threshold or below a threshold). This threshold can be a battery temperature threshold. For instance, the output power can be lowered when a temperature of the battery is below a threshold. In some embodiments, the control unit 106 adjusts the overall power delivered to the plasma arc torch based on the battery data. For example, the control unit 106 can lower the overall power delivered to the plasma arc torch 108 when a temperature of the battery is below a threshold. Such overall power can be generated by the battery pack 104 as well as by one or more additional power sources. In some embodiments, the control unit 106, based on the battery data from the battery pack 104, can prevent the plasma arc torch from being shut down, even when the battery temperature is below a certain threshold. In some embodiments, the control unit 106 can cause the system 100 to automatically select a specific cutting program, a current ramping profile or a gas ramping profile, or a combination thereof, to operate the plasma arc torch based on the battery data. In some embodiments, the control unit causes the plasma arc torch system 100 to configure itself differently depending on the state and type of the battery pack 104. For example, the system 100 can configure itself differently depending on whether the battery is suited for a 30-amp process or a 45-amp process. The system can also operate at other current levels and, as such, configure itself accordingly.

In addition, the control unit 106, based on the battery data, can send an audio or visual signal to an operator of the torch 108 to alert the operator to certain battery conditions. The control unit 106, based on the battery data, can also send a signal to a user interface of the plasma arc torch system 100 for displaying certain information. Such a signal may not be used for directly controlling the operation of the plasma arc torch 108. An operator, in response to receiving an alert signal from the plasma arc torch system 100, can improve battery performance and/or torch performance by, for example, selecting an appropriate cutting mode, changing cutting current or other torch parameters, or modifying how cutting is being performed, such as cut faster, cut slower, lower cut height, etc.

In some embodiments, the control unit 106, based on the battery data, can send signals to the battery pack 104 to adjust certain battery attributes, thereby optimizing battery performance. For example, the control unit 106 can turn the battery pack 104 on or off, provide setpoint information (e.g., current and/or power level setpoints), define fault conditions and/or set current output. In some embodiments, the control unit 106 can adjust the temperature of a heating and/or cooling unit (not shown) that is in thermal communication with the battery pack 104 so as to modulate the temperature of the battery pack 104. The heating and/or cool unit can be integrated with the battery pack 104 or external to the battery pack 104.

Run time tests, which measure the length of time a battery cell can support plasma arc torch cutting performance, have been conducted for multiple battery cells manufactured by multiple battery manufacturers. Each battery cell is also tested at different environmental temperatures within a temperature-controlled chamber and at different loading conditions, such as with a nominal load and several arc stretches. Loads and loading conditions can be explained with reference to the plasma arc torch Powermax30™ manufactured by Hypertherm Inc. This torch has a rated output of 30 A and 83V, which forms a 2.49 kW arc load. At an internal efficiency of approximately 80%, this torch thus requires an input power of approximately 3.1 kW to support its operation. One arc-stretch condition for the Powermax30™ torch may be that if the torch requires 125V in the arc at a current of 32 A, which translates to an arc load of 4.0 kW, an input power of 5.0 kW to the torch is required at 80% efficiency. Another arc-stretch condition may be that if the torch requires 150V in the arc at a current of 32 A, which translates to an arc load of 4.8 kW, an input power of 6.0 kW to the torch is required at 80% efficiency. Generally, for the battery cells tested, test results show that output voltage of the cells decrease with decreasing environmental temperature, resulting in an increase in the output current required for delivering the same amount of power to a load, thereby reducing run time. In addition, run time is reduced with increased load.

Figure 3:
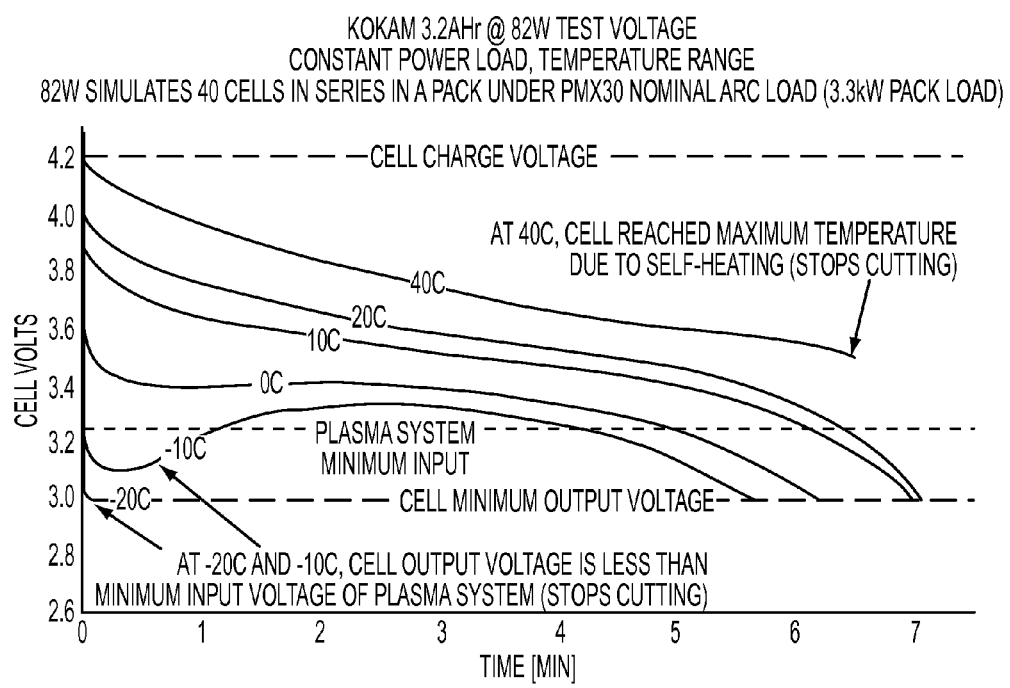
FIG. 3 illustrates a plot of test data for a battery cell.
Figure 4:
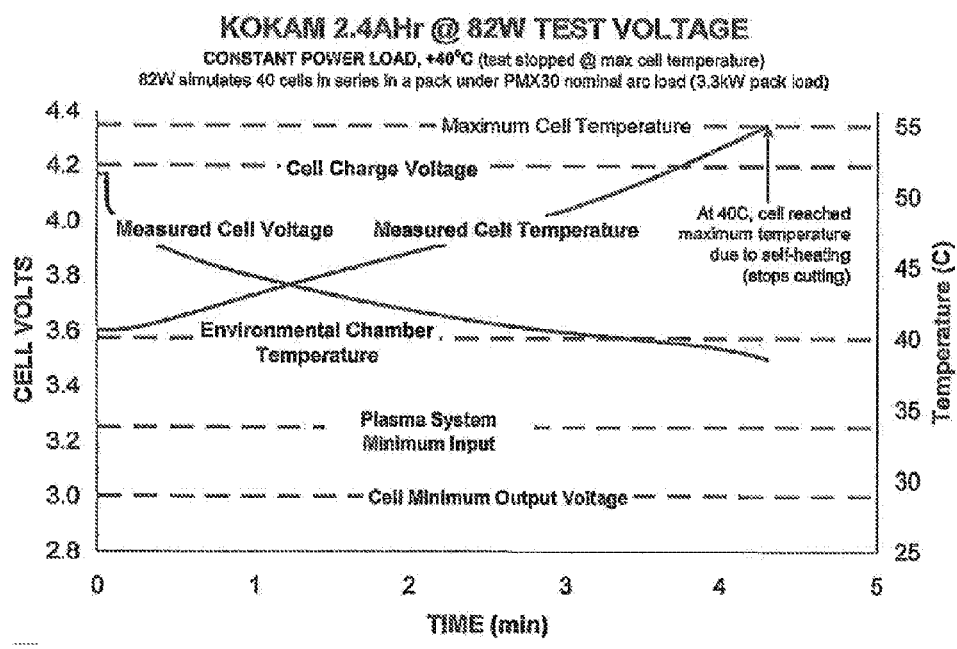
FIG. 4 illustrates a plot of test data for another battery cell.

FIG. 3 illustrates a plot of test data for one of the battery cells, which shows cell voltage output trend over time at six different environmental temperatures. As shown, at environmental temperatures of about −20° C. and about −10° C., the cell cannot meet the minimum input voltage requirement to operate a plasma arc torch and stops cutting operation after less than 30 seconds, even though the cell has enough energy to continue the cutting operation. At the environmental temperature of about 40° C., the battery cell reaches its maximum operating temperature and stops cutting after 6.5 minutes of operation, even though the cell has enough energy to continue to cut. FIG. 4 shows a plot of test data for another battery cell at the environmental temperature of 40° C. As shown, cell temperature increases over time during torch operation due to self heating while cell voltage decreases over time. This battery cell is smaller than the one used in FIG. 3, as such, it reaches its maximum temperature sooner in comparison to the battery cell of FIG. 3. Similar to the battery cell of FIG. 3, the battery cell of FIG. 4 reaches its maximum operating temperature at the environmental temperature of about 40° C. and stops functioning thereafter.

Therefore, to maximize torch run time, the control unit 106 can adjust at least one of the plasma arc torch 108 operating parameters or attributes of the battery pack 104. Since run time is reduced with decreased environmental temperature and increased load, the control unit 106 can control plasma arc as a function of temperature and/or load. For example, the control unit 106 can reduce a load condition, such as decrease the arc length, when the battery pack 104 is cold or when the load is too high. The control unit 106 can also reduce the output current and/or the output power generated by the battery pack 104 when it is cold. Furthermore, the control unit 106 can adjust the battery temperature itself when the environmental temperature approaches a certain high- or low-temperature threshold by, for example, modulating the temperature of the heating and/or cooling unit in thermal communication with the battery pack 104 so as to maintain the battery temperature within an acceptable range.

The plasma arc torch system 100 thus allows more energy to be extracted from the battery pack 104, resulting in longer cut durations, more battery cycles, improved cold temperature performance, among other benefits. In addition, the plasma arc torch system 100 can use a smaller battery pack 104 with fewer and/or lighter cells since the system 100 maximizes battery utilization. Using a smaller battery pack 104 also reduces battery cost and weight.

Figure 5:
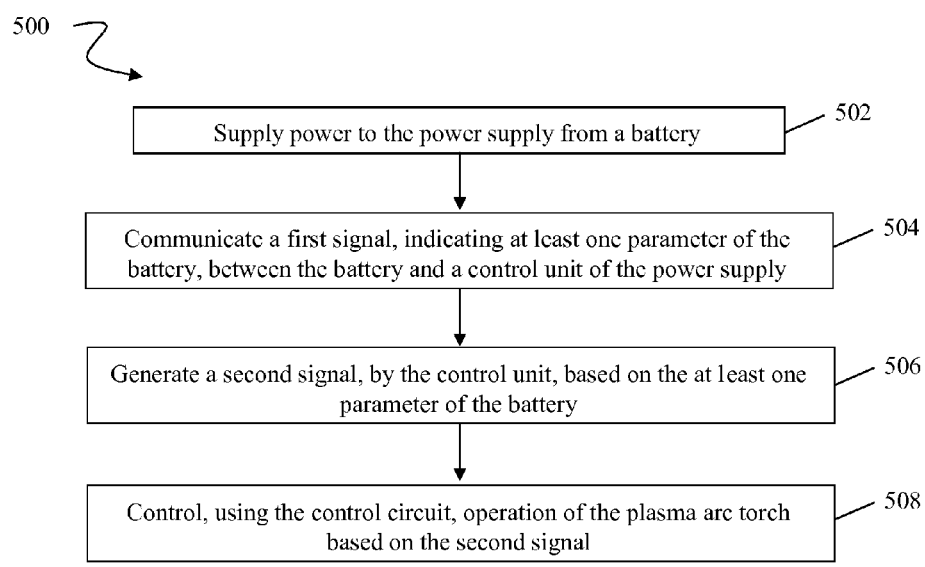
FIG. 5 shows an exemplary process for operating the plasma arc torch system of FIG. 1.

FIG. 5 shows an exemplary process for operating the plasma arc torch system 100 of FIG. 1. The process 500 starts with the battery pack 104 supplying power to the power supply 102 (step 502), where the battery pack 104 provides at least a portion of the power to generate a plasma arc by the plasma arc torch 108. In some embodiments, other power sources, combined with the battery pack 104, provide sufficient power to the plasma arc torch 108 to generate and maintain a plasma arc. The process 500 includes transmitting a first signal, indicating at least one parameter of the battery pack 104, between the battery pack 104 and the control unit 106 of the power supply 102 (step 504). The first signal can include parameter values associated with the battery pack 104, describing the status of various parameters/attributes of the battery pack 104. For example, the first signal can include information about battery current, temperature, state of charge, coulomb count, voltage, age, number of cycles, date, internal impedance, state of health, time to empty capacity, time to full capacity, discharge status, charge status, or capacity, or a combination thereof. After receiving the battery data from the battery pack 104, the control unit 104 generates a second signal (step 506) and controls operation of the plasma arc torch 108 based on the second signal (step 508) to optimize torch performance. The second signal can include a power input to the plasma arc torch 108, a current input to the plasma arc torch 108 and/or a selection of a cutting program, a current ramping profile or a gas ramping profile for operating the plasma arc torch 108. In some embodiments, the control unit 106 can further generate a third signal based on the battery data and communicate the signal to the battery pack 104 to optimize battery performance. The third signal can include, for example, a desired battery temperature, state of charge, voltage, current, or power. In some embodiments, the third signal includes desired value(s) for the parameter(s) associated with the first signal. In general, the process 500 can be performed on a periodic or continuous basis while operating the plasma arc torch 108.

It should also be understood that various aspects and embodiments of the invention can be combined in various ways. Based on the teachings of this specification, a person of ordinary skill in the art can readily determine how to combine these various embodiments.

What is claimed is:

1. A method for operating a plasma arc torch system having a power supply and a plasma arc torch, the method comprising:
   supplying power to the power supply from a battery, wherein the battery provides at least a portion of the power to generate a plasma arc by the plasma arc torch;
   supplying operating power to the plasma arc torch from the power supply;
   communicating a first signal, indicating at least one parameter of the battery including a temperature of the battery, between the battery and a plasma control circuit of a control unit, wherein the plasma control circuit is coupled to the power supply;
   generating a second signal, by a battery control circuit of the control unit, based on the at least one parameter of the battery, wherein the battery control circuit is coupled to the battery;
   lowering, using the plasma control circuit, the operating power supplied to the plasma arc torch based on the second signal when the temperature of the battery is below a threshold to maintain the plasma arc; and
   increasing, using the plasma control circuit, the operating power supplied to the plasma arc torch based on the second signal when the temperature of the battery exceeds the threshold to maintain the plasma arc.

2. The method of claim 1, wherein the at least one parameter of the battery further comprises at least one of a battery current, state of charge, coulomb count, voltage, age, number of cycles, date, internal impedance, state of health, time to empty capacity, time to full capacity, discharge status, charge status, or capacity, or a combination thereof.

3. The method of claim 1, further comprising preventing, by the plasma control circuit, the plasma arc torch from being shut down in accordance with the second signal.

4. The method of claim 1, further comprising transmitting the first signal via a power connection while the power connection provides power from the battery to the power supply.

5. The method of claim 1, further comprising adjusting the at least one parameter of the battery based on the operation of the plasma arc torch.

6. The method of claim 1, wherein lowering or increasing the operating power supplied to the plasma arc torch comprises using a cutting program, a current ramping profile or a gas ramping profile, or a combination thereof, to operate the plasma arc torch.

7. The method of claim 1, further comprising locating a plasma control circuit and a battery control circuit in a single enclosure, wherein 1) the battery control circuit determines the at least one parameter of the battery and forwards the parameter to the plasma control circuit and 2) the plasma control circuit controls the operation of the plasma arc torch based on the at least one parameter.

8. The method of claim 1, further comprising locating a plasma control circuit and a battery control circuit on a single circuit board inside of the control unit, wherein 1) the battery control circuit determines the at least one parameter of the battery and forwards the parameter to the plasma control circuit and 2) the plasma control circuit controls the operating process of the plasma arc torch based on the at least one parameter.

9. The method of claim 1, wherein the first signal includes information displayable by the plasma arc torch system to an operator of the plasma arc torch.

10. The method of claim 9, wherein the information is not used by the control unit to control the operation of the plasma arc torch.

11. A plasma arc torch system comprising:
a power supply for supplying an operating power to operate a plasma arc torch;
a battery for providing at least a portion of the operating power to generate a plasma arc; and
a control unit including:
1) a battery control circuit, coupled to the battery, configured to monitor battery data that includes a temperature of the battery; and
2) a plasma control circuit coupled to the power supply and in communication with the battery control unit, the plasma control circuit configured to:
receive the temperature of the battery from the battery control circuit and determine whether the temperature is above or below a temperature threshold;
deliver, at a first temperature of the battery below the temperature threshold, a first current to the plasma arc torch to maintain a plasma arc, and
deliver, at a second temperature of the battery above the temperature threshold, a second current to the plasma arc torch to maintain the plasma arc, wherein the second current is higher than the first current and the second temperature of the battery is higher than the first temperature of the battery,
such that (i) a current of the torch is decreased from the second current to the first current when the battery temperature is below the temperature threshold to enable torch operation when the battery temperature is low and ii the current is increased to the second current when the the battery temperature increases to above the temperature threshold due to self-heating of the battery during the torch operation.

12. The plasma arc torch system of claim 11, further comprising a circuit board including both the plasma control circuit and the battery control circuit.

13. The plasma arc torch system of claim 11, further comprising a single enclosure housing both the plasma control circuit and the battery control circuit.

14. The plasma arc torch system of claim 11, wherein the control unit is integrated with the power supply.

15. The plasma arc torch system of claim 14, further comprising a power connection between the power supply and the battery, wherein the power connection is configured to perform at least one of: 1) providing an electrical connection between the battery and the power supply, 2) transmitting the battery data between the battery and the control unit of the power supply, or 3) transmitting at least one instruction for operating the plasma arc torch between battery and the control unit of the power supply.

16. The plasma arc torch system of claim 11, further comprising a heating or cooling unit in thermal communication with the battery, wherein the control unit is adapted to adjust a temperature of the heating or cooling unit to modulate the temperature of the battery based on at least one operating parameter of the plasma arc torch.

17. The plasma arc torch system of claim 16, wherein the heating or cooling unit is integrated with the battery.

18. The plasma arc torch system of claim 11, wherein the control unit is further configured to cause to display at least a portion of the battery data to an operator of the plasma arc torch.

19. The plasma arc torch system of claim 11, wherein the battery data further comprises one of a battery current, state of charge, coulomb count, voltage, age, number of cycles, date, internal impedance, state of health, time to empty capacity, time to full capacity, discharge status, charge status, or capacity, or a combination thereof.

20. The plasma arc torch system of claim 11, wherein the control unit adjusts power supplied by the power supply to the plasma arc torch based on the battery data.

21. The plasma arc torch system of claim 11, wherein the plasma control circuit is further configured to reduce a power delivered to the plasma arc torch to maintain the plasma arc when the first temperature of the battery is below the temperature threshold.

22. A method for operating a plasma arc torch system having a power supply and a plasma arc torch, the method comprising:
supplying power to the power supply from a battery, wherein the battery provides at least a portion of the power to generate a plasma arc by the plasma arc torch;
supplying operating power to the plasma arc torch from the power supply;
communicating a first signal, indicating at least one parameter of the battery including a temperature of the battery, between the battery and a plasma control circuit of a control unit, wherein the plasma control circuit is coupled to the power supply;
generating a second signal, by a battery control circuit of the control unit, based on the at least one parameter of the battery, wherein the battery control circuit is coupled to the battery;
delivering, at a first temperature of the battery below a temperature threshold by the plasma control circuit, a first current to the plasma arc torch to maintain the plasma arc; and
delivering, at a second temperature of the battery above the temperature threshold by the plasma arc torch, a second current to the plasma arc torch to maintain the plasma arc, wherein the second current is higher than the first current and the second temperature of the battery is higher than the first temperature of the battery,
such that (i) a current of the torch is decreased from the second current to the first current when the battery temperature is below the temperature threshold to enable torch operation when the battery temperature is low and (ii) the current is increased to the second current when the the battery temperature increases to above the temperature threshold.

23. The method of claim 22, wherein the at least one parameter of the battery further comprises at least one of state of charge, voltage, current, or power.

24. A plasma arc torch system comprising:
a power supply for supplying an operating power to operate a plasma arc torch;
a battery for providing at least a portion of the operating power to generate a plasma arc; and
a control unit for reducing a value of at least one operating parameter of the plasma arc torch when a temperature of the battery is below a threshold, the control unit including:
1) a plasma control circuit coupled to the power supply for reducing the value of the at least one operating parameter of the plasma arc torch when the temperature of the battery is below the threshold, and
2) a battery control circuit coupled to the battery and in communication with the plasma control circuit, wherein the battery control circuit is configured to determine the temperature of the battery and provide the temperature to the plasma control circuit,
wherein the at least one operating parameter of the plasma arc torch comprises a current, power or load condition for operating the plasma arc torch.

25. A plasma arc torch system comprising:
a power supply for supplying an operating power to operate a plasma arc torch;
a battery for providing at least a portion of the operating power to generate a plasma arc; and
a control unit including:
1) a battery control circuit, coupled to the battery, configured to monitor battery data that includes a temperature of the battery; and
2) a plasma control circuit coupled to the power supply and in communication with the battery control unit, the plasma control circuit configured to:
receive the temperature of the battery from the battery control circuit and determine whether the temperature is above or below a temperature threshold;
deliver, at a first temperature of the battery below the temperature threshold, a first power to the plasma arc torch to maintain a plasma arc, and
deliver, at a second temperature of the battery above the temperature threshold, a second power to the plasma arc torch to maintain the plasma arc, wherein the second power is higher than the first power and the second temperature of the battery is higher than the first temperature of the battery,
such that (i) a power of the torch is decreased from the second power to the first power when the battery temperature is below the temperature threshold to enable torch operation when the battery temperature is low and (ii) the power is increased to the second power when the the battery temperature increases to above the temperature threshold.

* * * * *

UNITED STATES PATENT AND TRADEMARK OFFICE
CERTIFICATE OF CORRECTION

PATENT NO. : 9,522,438 B2  
APPLICATION NO. : 13/672956  
DATED : December 20, 2016  
INVENTOR(S) : Shipulski et al.

Page 1 of 1

It is certified that error appears in the above-identified patent and that said Letters Patent is hereby corrected as shown below:

In the Claims

In Claim 11, at Column 9 Line 51, amend "ii" to --(ii)--

Signed and Sealed this  
Eighteenth Day of April, 2017

Michelle K. Lee  
*Director of the United States Patent and Trademark Office*